Dec. 1, 1970     F. W. COOPER     3,543,338
MOLDING APPARATUS
Original Filed Dec. 3, 1965     5 Sheets-Sheet 1
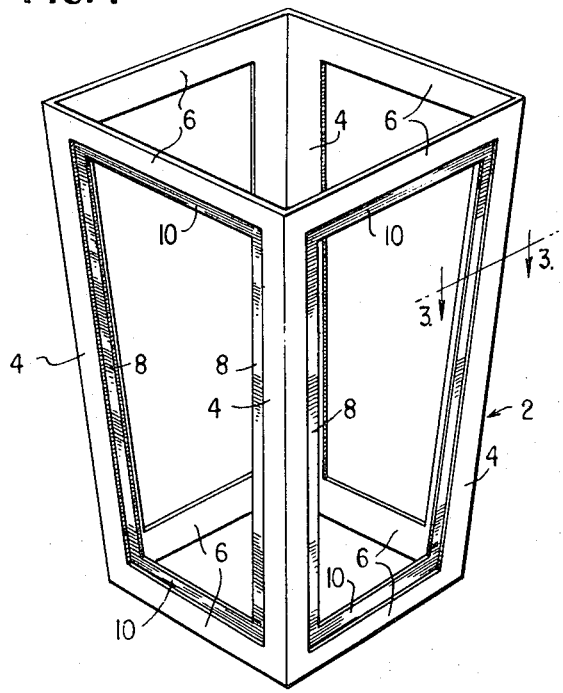
FIG. 1
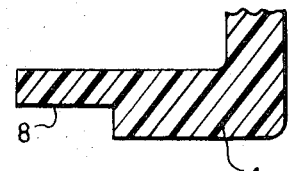
FIG. 3
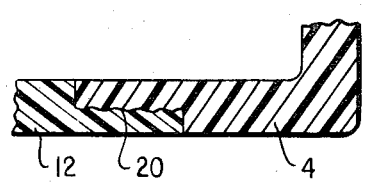
FIG. 4
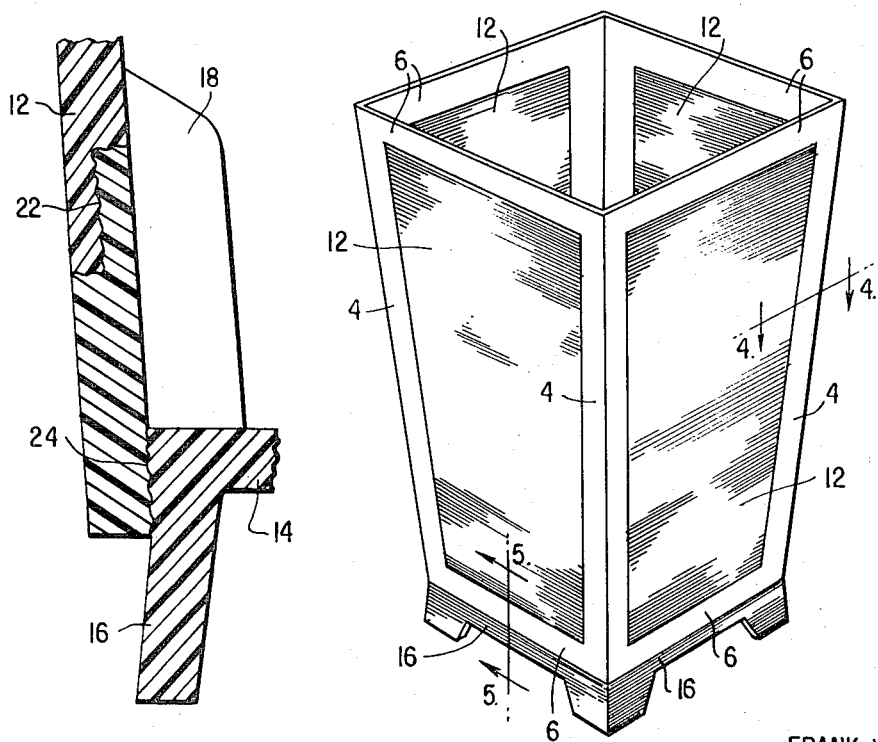
FIG. 5
FIG. 2
INVENTOR.
FRANK W. COOPER
By his attorney Dec. 1, 1970     F. W. COOPER     3,543,338
MOLDING APPARATUS Original Filed Dec. 3, 1965     5 Sheets-Sheet 2

INVENTOR
FRANK W. COOPER
By his attorney

INVENTOR.
FRANK W. COOPER
By his attorney

Dec. 1, 1970  F. W. COOPER  3,543,338
MOLDING APPARATUS
Original Filed Dec. 3, 1965  5 Sheets-Sheet 4
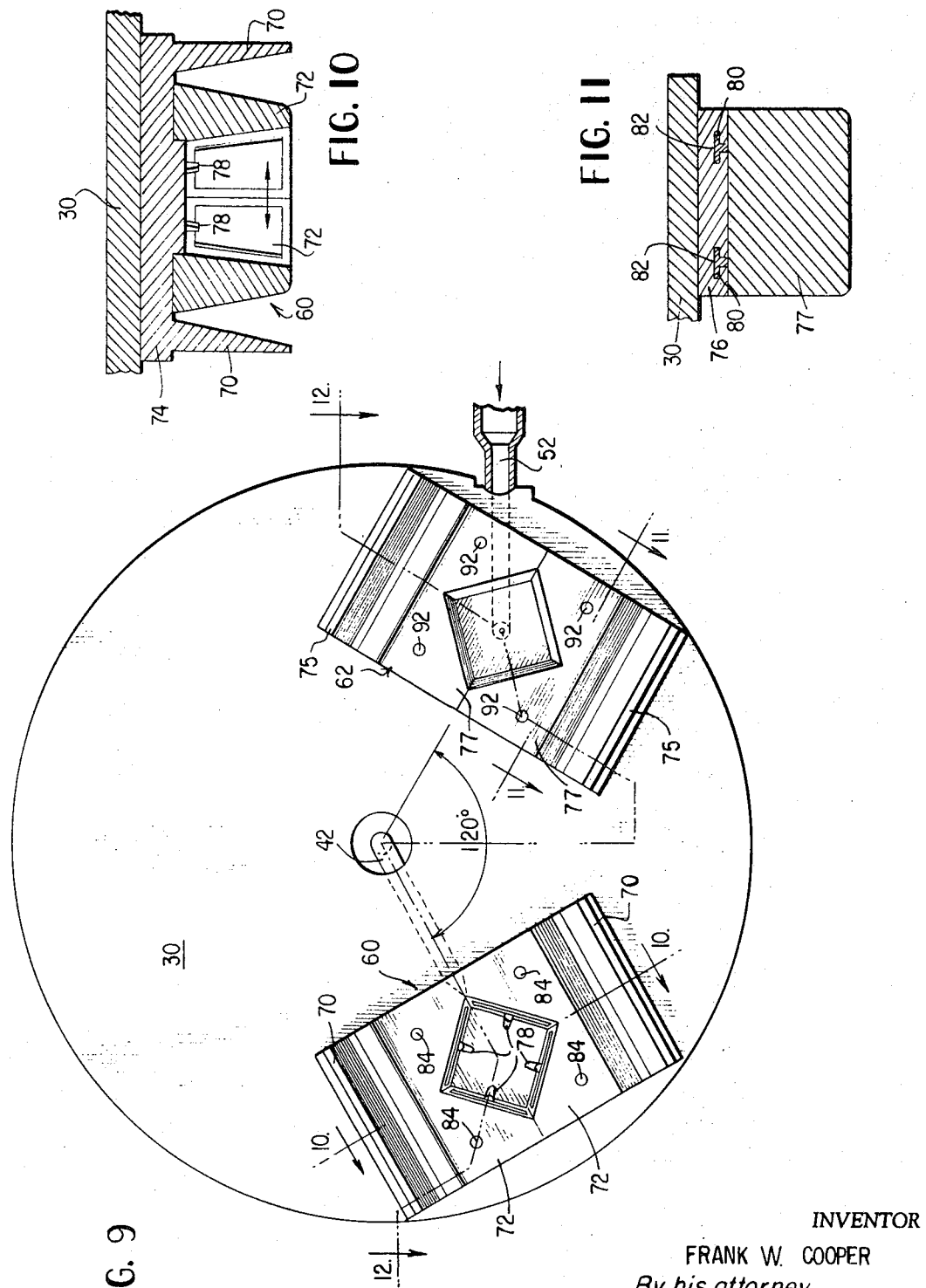
INVENTOR
FRANK W. COOPER
By his attorney United States Patent Office 3,543,338
Patented Dec. 1, 1970

3,543,338
MOLDING APPARATUS
Frank W. Cooper, McCandless Township, Pa., assignor, by mesne assignments, to Cities Service Company, a corporation of Delaware
Continuation of application Ser. No. 721,896, Dec. 27, 1967, which is a division of application Ser. No. 511,462, Dec. 3, 1965, now Patent No. 3,475,530. This application Nov. 6, 1969, Ser. No. 871,653
Int. Cl. B29c 9/00
U.S. Cl. 18—42      3 Claims

ABSTRACT OF THE DISCLOSURE

A molding apparatus for producing a hollow plastic article having fused together panels of different plastic materials is disclosed herein. The molding apparatus has lower and upper press platens mounted on a frame which are movable toward and away from each other, the lower press platen having three mold bases, each embodying similar mold cores and guide members, and the upper press platen having plastic injecting means and communicating passages to two different mold covers which are positioned on the upper platen to engage two of the mold cores when the platens are moved toward each other. The lower press platen is rotatably movable so as to position sequentially each mold base opposite a mold cover whereupon the platens are moved towards each other and plastic material injected into cavities formed by the mold covers engaging the mold cores. In operation a frame is first molded on a mold core then the platens are separated and the lower platen with the plastic frame being retained on the core is rotated and moved together again. A second shot of injected plastic material into the cavity formed by the other mold cover on the core retaining the plastic frame results in the plastic article having different plastic materials fused together.

This application is a continuation of Ser. No. 721,896, now abandoned, which in turn is a division of application Ser. No. 511,462 filed Dec. 3, 1965, now Pat. No. 3,475,-530. The invention relates to plastic moulding and, more particularly to apparatus for molding plastic articles.

Hollow articles, such as receptacles, containers and cabinets, may be molded out of plastic materials. Usually, hollow articles of this type are formed of a single piece of plastic, since it is difficult and expensive to join together several pieces of plastic to form a hollow article that is as strong as a one piece molded article.

When these articles are molded in one piece and ornamental panels are to be applied over a portion of the surface of the article, it is necessary to secure the panels mechanically to the surface of the articles. For example, the panels may be adhesively bonded to the surface of the article, or interlocking grooves may be formed in the surface and in the decorative panels for securing the panels to the surface.

Although mechanically securing the panels to the surface of the article may be satisfactory for some types of hollow articles, when the articles are subjected to severe wear, the panels may become separated from the article. Another disadvantage is that additional manufacturing time and equipment is required in order to secure the panels mechanically to the surface of the article. Also, when the panels are applied to the surface of the article they may present a bulky appearance.

Accordingly, it is an object of this invention to provide apparatus for forming articles having decorative panels thereon.

It is a further object of this invention to provide apparatus for rapidly and effectively applying decorative panels to hollow articles.

It is another object of this invention to provide apparatus for forming structurally sound hollow articles having panels of different plastic materials.

These objects are accomplished in accordance with a preferred embodiment of the invention by molding on a core a hollow plastic frame having an opening therein. While the molded frame remains on the same mold core, a mold cover is applied over the frame and the core. The contour of the cavity in the mold cover cooperates with the previously molded frame and the core to form a plastic receiving chamber across the opening. A shot of molten plastic is then injected into the mold to fill the chamber. The temperature and mass of the molten plastic is such that fusion occurs in the frame along the edge defining the opening. When the plastic has hardened, the mold is opened and the molded plastic article is removed from the mold. Color effects may be obtained by using plastics of different colors for the frame and for the panels. The plastics used for the frame and for the panels are thermoplastic and they must have a melting temperature that would permit the injected plastic to melt the frame at the exposed edge of the opening before the injected plastic hardens.

This preferred embodiment is illustrated in the accompanying drawings in which:

FIG. 1 is a perspective view of a frame for a receptacle in accordance with this invention;

FIG. 2 is a perspective view of a complete receptacle including the frame shown in FIG. 1;

FIG. 3 is a cross sectional view of the frame along the line 3—3 in FIG. 1;

FIG. 4 is a cross sectional view of the receptacle along the line 4—4 in FIG. 2;

FIG. 5 is a cross sectional view of the receptacle along the line 5—5 in FIG. 2;

FIG. 9 is a bottom plan view of the mold cover assembly;

FIG. 10 is a cross sectional view of the mold cover assembly along the line 10—10 in FIG. 9;

Figure 7:
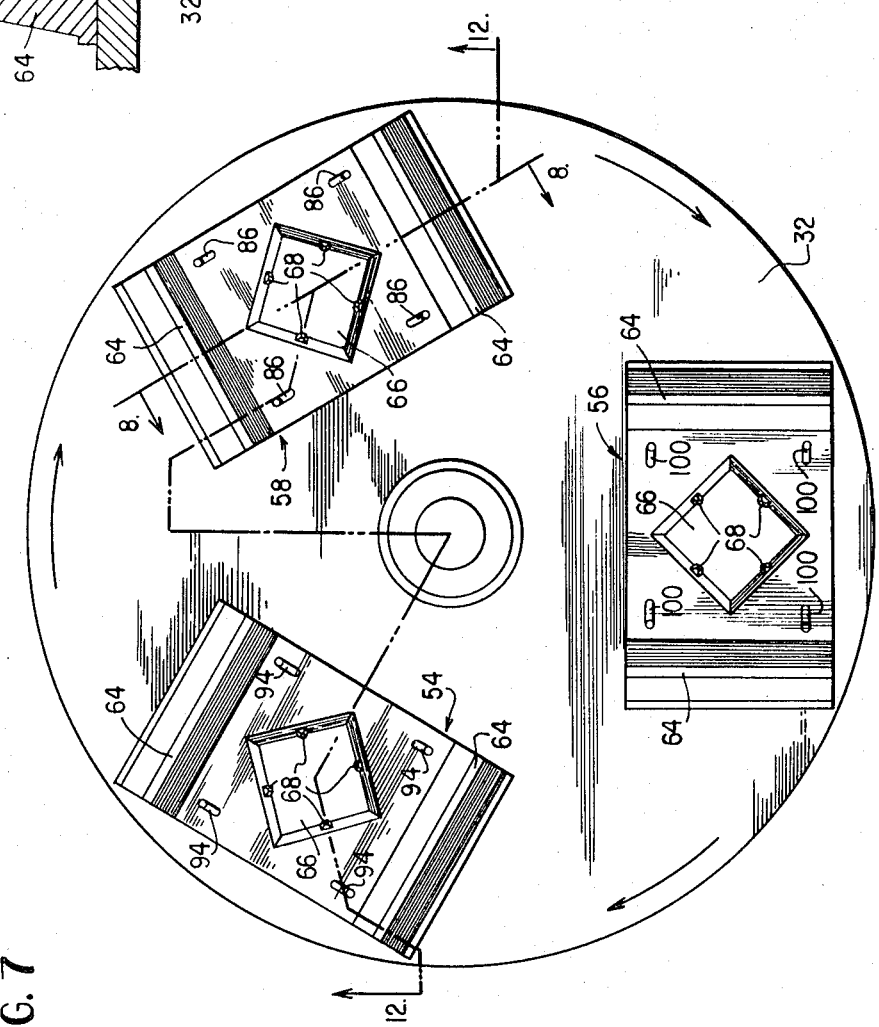
FIG. 7 is a top plan view of the mold turret.
Figure 12:
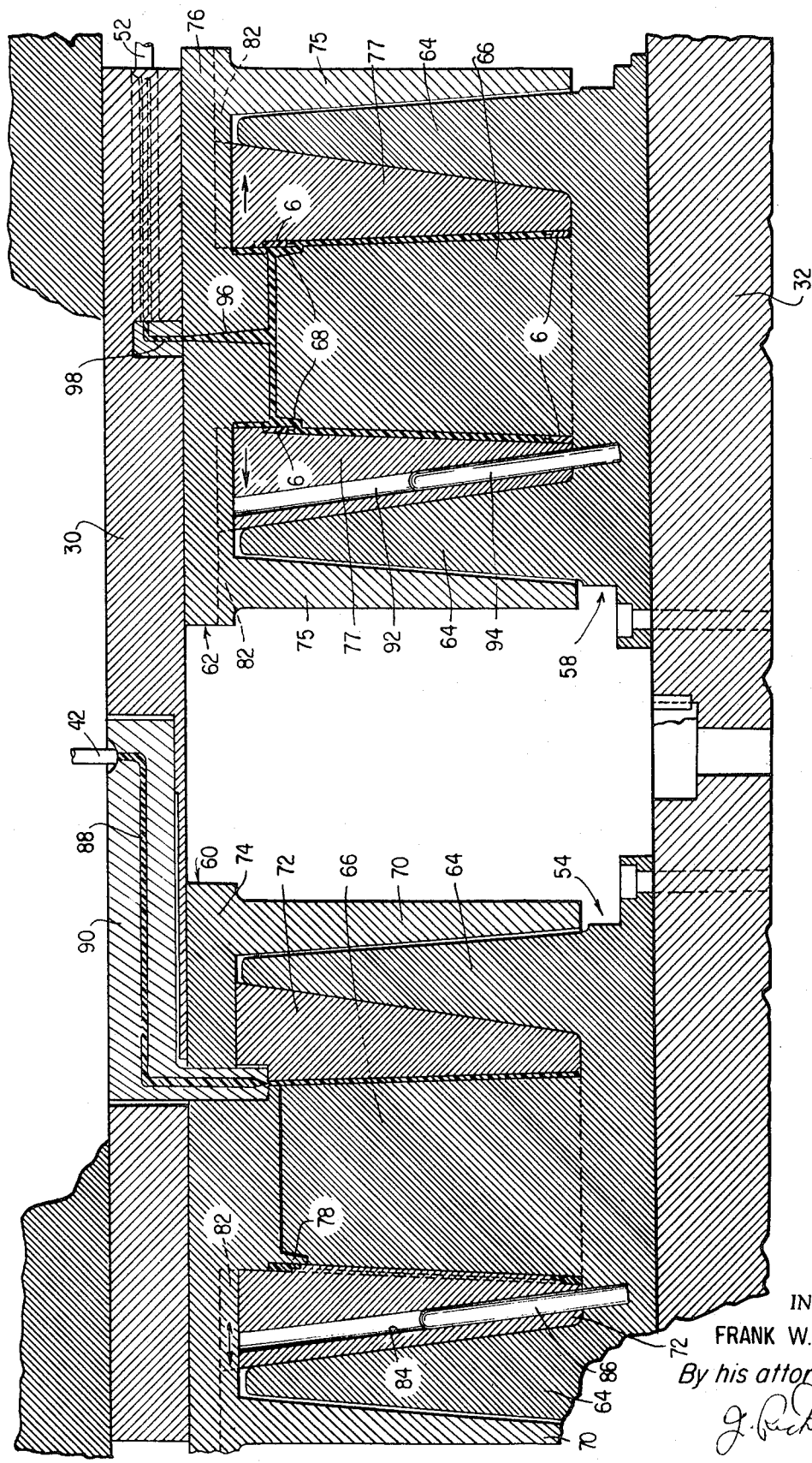

FIG. 11 is a cross sectional view of the mold cover assembly along the line 11—11 in FIG. 9; and FIG. 12 is a cross sectional view of the mold cover assembly and the mold turret along the lines 12—12 in FIGS. 7 and 9, showing the molds in their closed position.

Although the apparatus of this invention may be used for producing hollow plastic articles in an infinite variety of shapes and sizes, this invention will be illustrated and described for producing a hollow receptacle, as shown in FIG. 2. The receptacle includes a hollow frame 2, as shown in FIG. 1. The frame 2 is open at its opposite ends and has upright corner members 4 which are joined together at opposite ends by transverse web members 6. As shown in FIG. 3, the corner members 4 have a recessed shoulder 8 along each opposite edge and there are similar recessed shoulders 10 along the adjacent edges of the web members 6. After the frame 2 has been molded, a second mold is placed around the frame to form a chamber extending across the openings between the corner members 4 and the web members 6. Molten plastic is then injected into the chamber to form panels 12 on the frame. At the same time that the panels 12 are being molded, a bottom 14 (FIG. 5) and leg portions 16 are also formed. Preferably, there is a runner 18 which iterconnects the bottom 14 and each panel 12 to provide a flow path for the molten plastic from the bottom 14 to the panels 12. The cross sectional area of the runner 18 should be sufficiently large to prevent premature hardening of the plastic when it is being injected.

As shown in FIGS. 4 and 5, the junctions 20, 22 and 24, between the frame 2 and the subsequently applied panels 12 and leg portions 16 are irregular. Preferably, the later injected plastic has a sufficiently high temperature and is injected at a sufficiently high rate to cause melting along the surface of the shoulders 8 and 10 on the frame 2. As the later injected plastic flows along the shoulders 8 and 10, there is a tendency for mixing of the plastic forming the frame 2 and the later injected plastic, and when the completed article is cooled to room temperature, the junctions 20, 22 and 24 are practically obliterated, unless the plastic in the panels 12 and leg portions 16 has a different color or texture from that of the frame 2. However, if the plastic in the panels 12 is of a different color from that of the frame 2, there is a clear and sharp line of demarcation along the external edge on the outside of the receptacle because the mold quickly cools the outer surface of the plastic in the panels 12 so that there is practically no fusion along the edges of the frame 2 at the mold surface. The greatest extent of surface melting of the frame 2 occurs along the shoulders 8 and 10 which are spaced from the surface of the mold. Accordingly, the completed article is formed with sharply outlined color panels 12 and leg portions 16. Furthermore, the fusion that occurs between the frame 2 and the panels 12 and leg portions 16 forms a bond that is substantially as strong as the receptacle would be if formed of a solid single piece of plastic.

Figure 6:
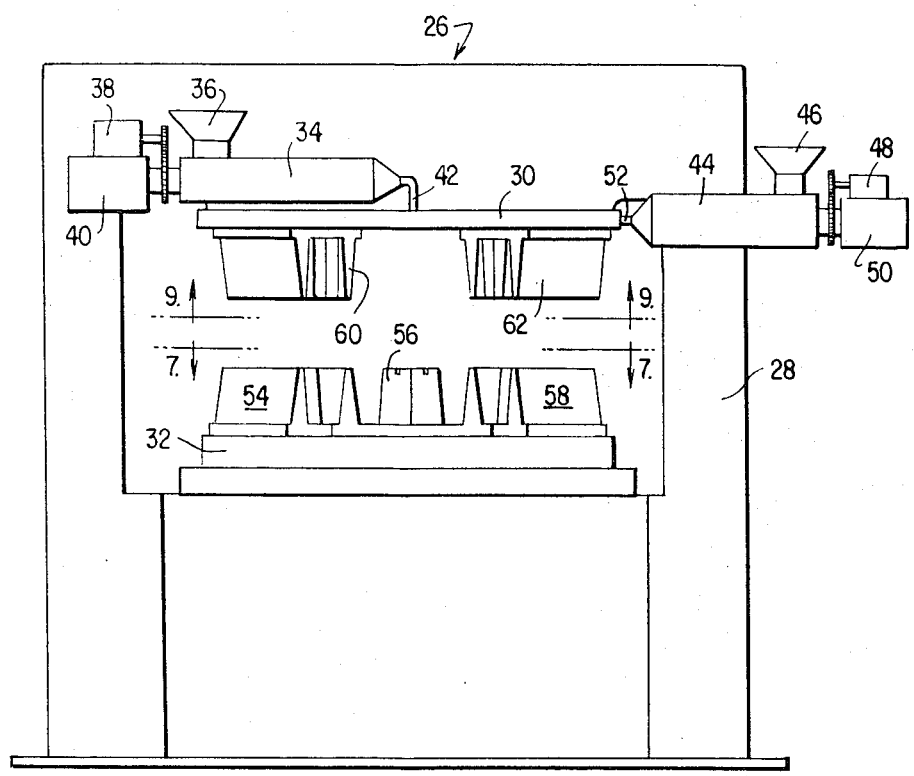
FIG. 6 is a side elevational view of a molding press in accordance with this invention.

A schematic view of a molding machine 26 for producing the hollow receptacles in accordance with this invention is shown in FIG. 6. The molding machine 26 includes an upright frame 28 and an upper platen 30 is mounted rigidly on the frame 28. A lower platen 32 is supported in the base of the frame 28. The lower platen 32 may be raised and lowered relative to the frame 28 and may be rotated about the central axis of the platen 32 by suitable conventional means. A first plastic injector 34 is mounted on the frame 28 above the upper platen 30. The injector 34 includes a hopper 36, a motor 38 for rotating a worm in the body of the injector, and a hydraulic cylinder 40 for rapidly injecting the molten plastic into the mold. The outlet of the injector is connected by a conduit 42 with the platen 30 where it is conducted to a mold. A second injector 44 is also mounted on the frame 28 and includes a hopper 46, a motor 48 and a hydraulic cylinder 50. The outlet of the injector 44 is connected with a passage in the platen 30 by means of a conduit 52.

Figure 8:
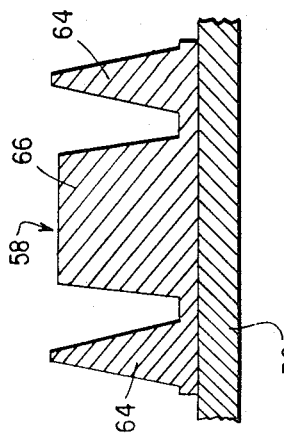
FIG. 8 is a cross sectional view of the turret along the line 8—8 in FIG. 7.

There are preferably three separate mold bases 54, 56 and 58, rigidly secured to the lower platen 32 and two mold covers 60 and 62 which are rigidly secured to the upper platen 30, as shown in FIGS. 6, 7 and 8. The mold bases 54, 56 and 58 have upright guide members 64 at each opposite end and a mold core 66 projects upwardly at the center of each of the respective mold bases. Each of the cores 66 has a short groove 68 extending from the top of the core along each of the sides. The upper platen and mold cover assemblies are shown in FIGS. 9, 10 and 11. The first mold cover 60 includes guide members 70 and mold segments 72 which are mounted in key slots in the base portion 74 of the mold cover 60. Similarly, the mold cover 62 has guide members 75 extending upright from the base portion 76 and mold segments 77 which are keyed to the base portion 76. The base portion 74 of the first mold cover 60 includes projecting ribs 78 corresponding in size and position to the grooves 68 in each of the cores 66.

As shown in FIGS. 11 and 12, the mold segments 72 and 77 are secured in the base portions 74 and 76, respectively, of each of the covers 60 and 62, by means of keys 80 which are rigidly secured to the bottom of each of the segments 72 and 77. The keys 80 are mounted in key slots 82 which extend longitudinally of the mold covers 60 and 62. The keys 80 support the mold segments in an upright position as shown in FIG. 12, and there is only a minimum of frictional resistance between the key slots 82 and the keys 80, so that the segments move freely longitudinally of the respective mold covers.

Each of the mold segments 72 has a longitudinal bore 84 which is in position to receive a peg 86 which is rigidly secured in the base member 54. When the press platens are moved toward each other, the ends of the pegs 86 are guided into the bores 84 by the sloping side wall of the guides 64. When the mold is fully closed, the core 66 abuts against the base portion 74 of the mold cover 60. The mold cavity thus formed between the mold base 54 and the mold cover 60 is substantially the same as the frame 2 in FIG. 1. The ribs 78 on the base portions 74 cooperate with corresponding grooves in the core 66 of the mold base 54, so that the grooves do not become filled with plastic during the molding of the frame 2.

When the mold is closed and the mold platens 30 and 32 are pressed toward each other with sufficiently high axial force, molten plastic is injected from the first extruder 34 through the outlet tube 42 and through a passage 88 in a runner 90 in the top platen 30. Usually, the temperature of the plastic that is injected is between 500° and 750° F., depending upon the type of thermoplastic resin which is used. The plastic is injected very rapidly so that it does not harden permaturely in the passages and prevent plastic from reaching all parts of the mold cavity. Preferably, the plastic is injected at a sufficiently high pressure that the mold cavity is filled in less than one-half a second.

Molten plastic is injected separately through the second mold cover 62. The mold cover segments 77 are movable toward and away from the core 66 of the base 54 along the keyways 82. Each of the segments 77 has longitudinal bores 92 which are in position to receive pegs 94 which are rigidly secured in the base 58. The mold base 58 is substantially identical to the mold base 54, but the mold cover 62 forms a mold cavity around the frame 2 and therefore it has a different structure from that of the cover 60. The plastic frame 2 is clamped in the mold and occupies a portion of the mold cavity. The webs 6 of the frame 2 are shown in FIG. 12. When the mold is fully closed, the central portion of the base 76 is spaced axially from the outer end of the core 66 and a sprue 96 extends through the center of the base 76, as shown in FIGS. 9 and 12. Molten plastic from the second extruder 44 is conducted to the mold cavity from the outlet 52 through a passage 98 in the uper platen 30. The plastic is conducted from the portion of the cavity forming the bottom of the article through the grooves 68 in the core 66 and into the cavity forming the side panels of the article. The molten plastic is injected rapidly at a sufficiently high temperature for it to remain in a liquid condition until the mold cavity is entirely filled. When the second shot of molten plastic contacts the previously formed frame members 2 in the mold cavity, a partial fusion occurs at the interface between the previously formed frame 2 and the molten plastic. The mold base 58 and the cover 62 are at a temperature substantially lower than the melting temperature of the second shot of plastic, and therefore substantially no melting of the frame 2 occurs in the frame surfaces which contact the walls of the mold cavity.

After the plastic in the second shot has hardened, the mold may be opened to remove the finished articles. As the mold opens, the pegs 94 guide the mold segments 77 apart from each other, thereby allowing clearance for removal of the completed article. The plastic in the sprue 96 hardens when the flow of plastic stops, and when the mold opens, the plastic in the sprue breaks off at the outlet of the passage 98 and remains attached to the molded article. At the same time, a clot forms in the end of the passage 98 to prevent the leakage of molten plastic until the next shot is made.

As shown in FIG. 7, each of the mold bases 54, 56 and 58 are substantially identical. The mold base 56 does not cooperate with either of the mold covers 60 and 62 when it is in the position shown in FIG. 7. However, when the lower platen 32 rotates, the mold base 56 moves into position for engaging one of the covers 60 and 62. Therefore, the base 56 includes upright pegs 100 which are in position to engage either of the longitudinal bores 84 and 92 in the mold segments 72 and 77, respectively. Thus the mold bases are completely interchangeable. The lower platen 32 is rotated by any suitable indexing means, so that the bases 54, 56 and 58 are accurately positioned in alignment with the respective cover mold assembly 60 or 62. The lower platen 32 moves in the direction of the arrows in FIG. 7 to cause the frame 2 to be molded first by the cover assembly 60 and then the side panels and bottom are applied by the mold cover assembly 62.

In operation, the plastic injectors 34 and 44, respectively, are filled with suitable thermoplastic resins. Preferably, the plastics in the injectors 34 and 44 are of different colors. However, platsics of different compositions also may be utilized, provided the plastics are compatible as to temperature ranges and thermal expansion. The plastics must be capable of fusing together to form an integral mass when cooled. The lower platen 32 is indexed to position the mold bases 54 and 58 in alignment with the mold covers 60 and 62, respectively. The lower platen 32 is then elevated to cause the movable segments 72 and 77 to engage the guide portions 64 on the respective mold bases. The pegs 86 on the mold base 54 engage the bores 84 in the mold segments 72 and similarly, the bores 92 in the mold segments 77 engage the pegs 94 in the mold base 58.

When the molds are fully closed, sufficient force is applied between the platens to hold the mold covers and bases together and to withstand the pressure of the injected plastic. Molten plastic is injected through the passages 88 and 92 and into the respective mold cavities. Since the temperature of the mold bases and segments is considerably lower than the temperature of the plastic, the plastic quickly hardens. The mold then may be opened by lowering the platen 32. The pegs 86 and 94 guide the respective mold segments apart from each other as the mold covers and bases separate. When the platens have moved apart to the positions shown in FIG. 6, the lower platen 32 is indexed to move the bases 54, 56 and 58 approximately 120°. The completed article is then removed from the mold base 58 which is now positioned at the front of the machine and the mold base 56 is rotated under the mold cover 60. The mold base 54 on which the frame 2 has been molded is positioned under the mold cover 62. The press platens 30 and 32 may again be moved toward each other for forming another frame on the base 56 and for applying the second shot to the frame previously formed on the base 54. After injection of the plastic, the platen 32 is again lowered and indexed, and the completed article is removed from the mold base 54.

One particular advantage of utilizing substantially identical mold bases is that both the first and second shots of plastic are accomplished without removing the molded article from the core on which it is formed. There is a natural tendency for plastics to shrink upon cooling, and since the plastic remains on the core 66, between the first and second shots, the plastic does not have an opportunity to shrink. Another advantage is that the frame is accurately positioned on the core when the second shot of platsic is injected, thus assuring a very close fit between the mold base and the mold cover. Furthermore, by molding a frame in one mold cavity and the injecting molten plastic around the frame in a second mold cavity, an integral article is molded having portions formed of one plastic and other portions formed of another plastic. Plastics of different colors may be used for the frame and for the second shot of plastic in order to provide decorative color effects, or plastics having different physical properties may be used to improve the structural characteristics of the article.

While this invention has been illustrated and described in one embodiment, it is recognized that variations and changes may be made therein without departing from the invention as set forth in the claims.

What is claimed is:

1. Plastic molding apparatus comprising a first press platen and a second press platen, means for selectively moving said platens toward and away from each other, at least three mold stations mounted on said first platen, each of said mold stations comprising a mold base, and a core extending upright from said base, said second platen having at least two mold covers, each of said mold covers having a plurality of radially mounted mold segments in position to engage corresponding first platen cores to form mold cavities therebetween when said first and second platens are moved towards each other, said mold station also comprising a plurality of pegs and wedge shaped guide members extending beyond said pegs mounted on each of said mold bases for displacing each of said mold segments radially towards each of said mold cores and for positioning each of said plurality of mold segments relative to said pegs upon said movement of said mold platens toward each other, said mold segments each having a bore therein, and each of said pegs being mounted to engage a correspondingly positioned bore upon said movement of said platens toward each other, means for independently injecting molten plastic through said second platen into said mold cavities, and means for rotating said first platen about the axis of reciprocating movement of said platens for indexing said first platen relative to said second platen whereby said mold stations engage said second platen mold covers sequentially.

2. Plastic molding apparatus according to claim 1 wherein said first platen mold stations each have the same mold shape, said second platen mold segments having different mold shapes, the segments of a first mold cover forming a mold cavity corresponding to a base article with openings therethrough, and the segments of a second mold cover forming a mold cavity corresponding to the finished article, whereby the base article is molded at a first station, and molten plastic is independently injected into said openings at a second station.

3. Apparatus for molding plastic articles according to claim 1 additionally comprising key means mounted on said mold cover for supporting and moving each of said plurality of mold segments transversely toward and away from each of said mold cores in response to the engagement of said pegs in said segment bores.

References Cited

UNITED STATES PATENTS

| 2,226,408 | 12/1940 | Nast. | |
| 2,333,059 | 10/1943 | Tucker. | |
| 2,783,502 | 3/1957 | Abplanalp. | |
| 3,031,722 | 5/1962 | Gits | 18—42 X |
| 3,086,245 | 4/1963 | Gits | 18—42 X |
| 3,183,552 | 5/1965 | Farkas | 18—42 X |
| 3,259,356 | 7/1966 | Hekl | 18—42 X |
| 3,276,078 | 10/1966 | Morin | 18—42 X |
| 3,373,460 | 3/1968 | Lodney | 18—42 |
| 3,319,300 | 5/1965 | Hekl | 18—42 X |

J. HOWARD FLINT, Jr., Primary Examiner

U.S. Cl. X.R.

18—30, 36; 247—60; 264—246